US006007903A

United States Patent [19]

Vignudelli

[11] Patent Number: 6,007,903

[45] Date of Patent: Dec. 28, 1999

[54] SHIELDING MATERIAL HAVING A RADIATION ANTISTRESS EFFECT

[75] Inventor: Adriano Vignudelli, Spilamberto, Italy

[73] Assignee: Spengold Limited, London, United Kingdom

[21] Appl. No.: 09/065,083

[22] PCT Filed: Oct. 25, 1996

[86] PCT No.: PCT/IT96/00196

§ 371 Date: Apr. 27, 1998

§ 102(e) Date: Apr. 27, 1998

[87] PCT Pub. No.: WO97/15931

PCT Pub. Date: May 1, 1997

[30] Foreign Application Priority Data

Oct. 27, 1995 [IT] Italy ................................ B095A0509

[51] Int. Cl.[6] ........................................................ B32B 7/08

[52] U.S. Cl. ........................... 428/223; 428/86; 428/102; 428/900; 428/913; 442/261; 442/286; 442/381; 442/394

[58] Field of Search .................................... 442/261, 277, 442/286, 381, 394; 428/102, 181, 223

[56] References Cited

U.S. PATENT DOCUMENTS 2,858,410 10/1958 Rich ........................................ 219/46

FOREIGN PATENT DOCUMENTS

| | | | |
|---|---|---|---|
| 0073648 A2 | 3/1983 | European Pat. Off. | B29D 3/02 |
| 3038480 A1 | 5/1982 | Germany | A47H 23/05 |
| 3207014 A1 | 9/1993 | Germany | A47G 9/02 |
| 2011499 | 1/1990 | Japan . | |
| WO89/12706 | 12/1989 | WIPO | D02G 3/12 |
| WO 97/15931 | 5/1997 | WIPO . | |

OTHER PUBLICATIONS

Mochizuki Akio, “Thermal Blanket”, Jan. 16, 1990, Patent Abstracts of Japan.

*Primary Examiner*—Terrel Morris
*Assistant Examiner*—Arti R. Singh
*Attorney, Agent, or Firm*—Fenwick & West LLP

[57] ABSTRACT

The base material can be obtained by means of the realisation, on a support made out of material or nonmaterial, of a system of two crossed orders, uniformly distributed, of rectilinear stitching carried out with a yarn having a metallic core inside. In this way, an incorporated shielding metallic screen made of metallic cores is obtained.

8 Claims, 2 Drawing Sheets

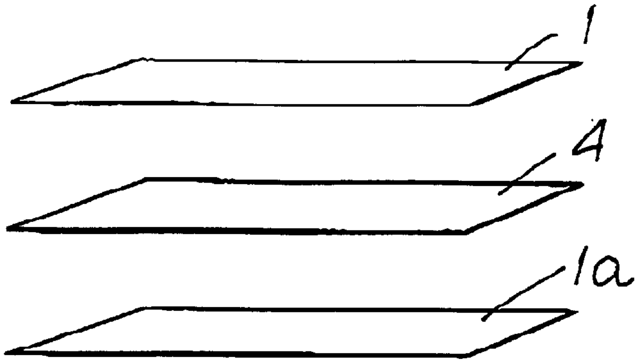
Fig. 1
Fig. 2
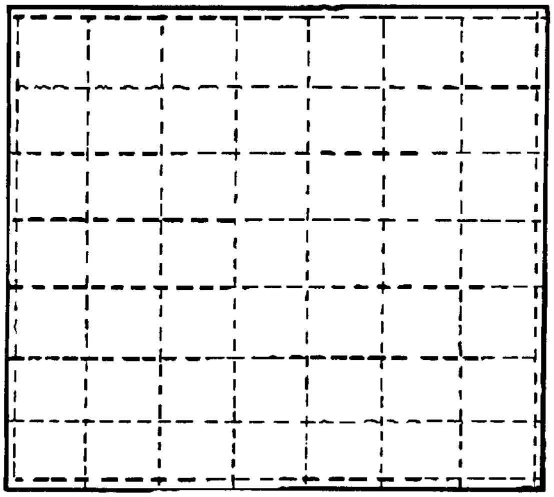
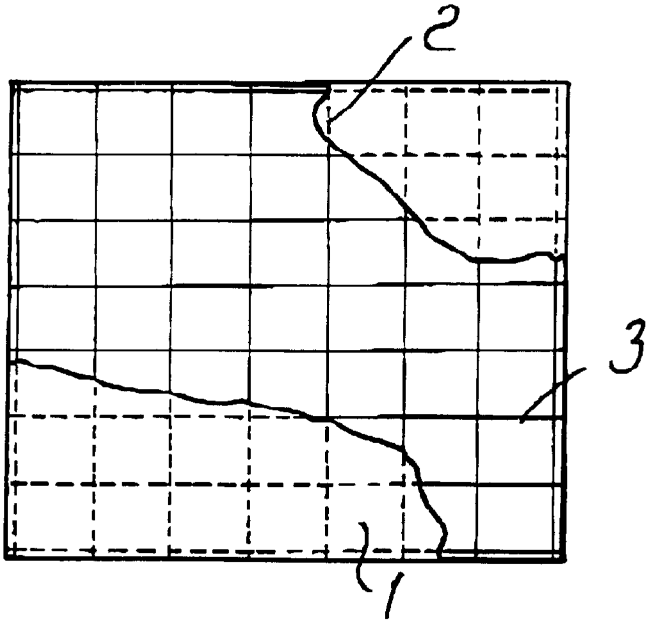
Fig. 3

SHIELDING MATERIAL HAVING A RADIATION ANTISTRESS EFFECT

BACKGROUND OF THE INVENTION

The present invention relates to a material that cannot be penetrated by forms of electromagnetic energy propagation, both in the form of waves and particles which are particularly light, flexible and thin which can be used in garments, for example incorporating it between the parts of the lining and the external of the garment, or for making suits for protecting the human body from radiation stress. The material can both be used generally and for specific use, for example for the protection of the personnel operating in radio stations, in X ray areas and on board submarines, and for the conventional use of electrical equipment such as irons, microwave ovens and the like. Said material can be produced in bobbins so as to make it possible to obtain the shapes to be worked by die cutting or other related processes. In order to obtain an antistress radiation material of a particular consistency, there is provided an integrally operating unit meant for the stitching or for the welding lines, said unit being composed of two shielding parts between which is interposed a plate-like part acting as a structural element. Furthermore, using in the above mentioned composite version, a part of interposition with excellent heat insulating characteristics, which for example can be obtained from polyethylene plates which are suitably equipped with a uniform system distributed with holes so as to allow for the transpiration of the human body, a new kind of material is obtained with the characteristics which are similar to those already mentioned in terms of lightness, flexibility and thinness, thus resulting impenetrable to the forms of electromagnetic energy propagation and capable of simultaneously holding back the body heat according to preestablished values. In the prior art technique, in order to protect the human body from the forms of electromagnetic energy propagation which can be found in sender equipment, for example computers, cellular telephones, television systems, white goods and the like, a metallic screen is used inside the bodies of said equipment which, operating as shielding barriers, prevents the propagation of the radiation to the outside. The above mentioned shielding system, as it provides for a positional impenetrability, it is not capable of preventing the exit to the outside of a considerable amount of radiation because of the presence of various parts or components which cannot be shielded; furthermore it doesn't provide for any protection for the personal who have to intervene on the conventional resetting operations and adjustment of the sending equipment. For these tasks, for power plant operators, transreceiver plant operators, and the like, is evisaged a rigid structure, worn by the operator, with a shielding metallic screen incorporated on the inside. These are shielding means that are fundamentally meant for the use of particular tasks and whose weight and overall dimensions make them unfit for general use.

Known from "INDUSTRIAL SCREENING AND FILTRATION MEDIA-GENERAL CATALOG NO. 2000", Tetko Inc., 1978, are conductive fabrics woven with metallic thread periodically inserted in either the warp, weft, or both, designated for applications as carrier belts.

Moreover, PATENT ABSTRACTS OF JAPAN vol.014, no.147 (M-0952) & JP 2011499 disclose a thermal blanket with mesh-like stitches on a metal deposition film. WO 89/12706 discloses a yarn consisting of a textile roving which contains metal fibers and other fibers, and a thread made from one or more such textile rovings and their use for obtaining woven materials for electromagnetic screening purposes.

Furthermore, from DE-A-3207014 it is known a blanket made of fabric wherein a metallic thread is woven to form a metallic net.

SUMMARY OF THE INVENTION

The present invention provides a solution to the above mentioned problems by making available shielding material of a new kind made in sheets which are particularly light, flexible and thin supplied to the manufacturing industry in bobbins from which can be cut the shapes to be worked for the variety of designs. Substantially, the base material is obtained by means of the realisation, on a support made out of material or non material 1, of a system of two crossed orders, uniformly distributed, of rectilinear stitching carried out with a yarn 2 having a metallic core 3 inside. In this way, an incorporated shielding metallic screen made of metallic cores 3 is obtained. In order to obtain a product of particular consistency, a composite material is provided which is constituted by two supports 1 with a structural support 4 interposed the whole system being made operative and integral by means of a system of stitching, as already mentioned, with yarn 2, with a metallic core 3. By using in the composite material a structural support 4 with excellent insulating characteristics, such as polyurethane, and appropriately equipping it with a system of holes uniformly distributed, in order to permit the transpiration of the human body, a shielding material is obtained which is capable of simultaneously holding the body heat according to preestablished values.

BRIEF DESCRIPTION OF THE DRAWINGS

Hereunder is illustrated, in the form of a non-limiting example, a preferred embodiment with the aid of the accompanying drawings in which:

FIG. 1 is an exploded view of the two types of sheet support provided for obtaining the composite material in order;

FIG. 2 is, a side view of the composite material, already completed by means of realisation of the stitching system of crossed orders, said stitching being obtained with yarn 2 incorporating a metallic core 3;

FIG. 3 is a view of the same square of material showing a view of a section of surface so as to observe the shielding screen formed by crossed lines of metallic cores 3;

Figure 4:
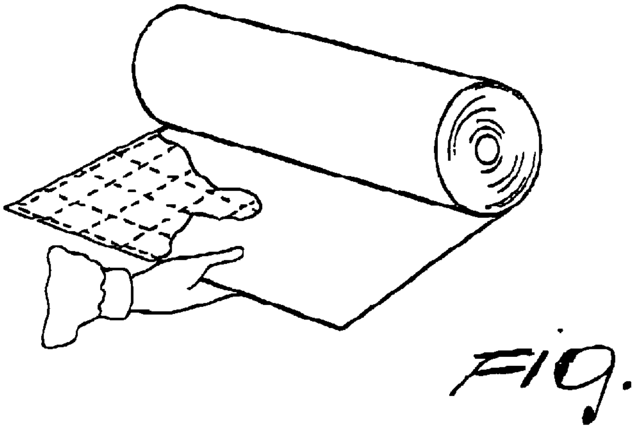
FIG. 4 is a hydrographic view of a material on the bobbin at the beginning of the unwinding for the cutting of the shapes to be worked.
Figure 5:
Figure 6:
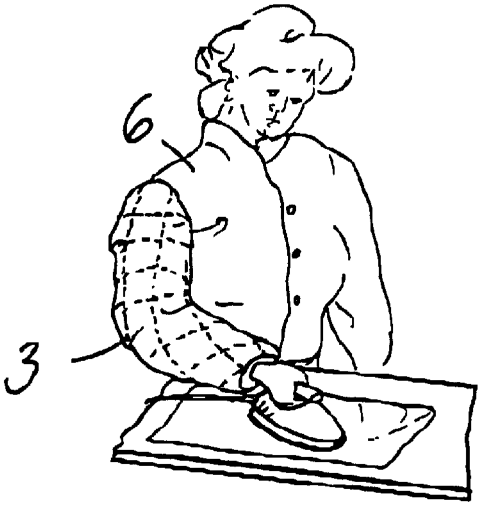

Indicative forms of the field of use of the material in order are shown as examples in FIGS. 5 and 6;

FIG. 5 is a detailed view of the use of the material incorporated in a piece of clothing 5 worn by an operator in a plant where electronic equipment is used;

FIG. 6 shows the use of a protective suit 6 worn by a person ironing blankets using an electric iron.

In the embodiments, the form and the typology, the materials and the like can vary in relation to the specific use.

I claim:

1. Shielding material for making clothing having electromagnetic energy propagation protecting effect, comprising a first layer of woven or non-woven material and a second layer of woven or non-woven fabric and a structural support interposed between said first layer and said second layer and a system of stitches disposed on said first layer with yarn including a metallic core, said system of stitches comprising uniformly distributed crossing rows of stitches, said structural support first and second layers being made integral by said system of stitches.

2. Shielding material according to claim 1, characterized in that said structural support (4) is made of a heat insulating material.

3. Shielding material according to claim 2, characterized in that said structural support (4) is made of polyurethane.

4. Shielding material according to claim 1, characterized in that said structural support (4) is provided with uniformly distributed holes.

5. Shielding material according to claim 1 characterized in that external coatings are provided on each side of said material.

6. Shielding material for making clothing having electromagnetic energy propagation protecting effect, comprising a support made of woven or non-woven material and a system of stitches disposed on said support with a yarn including a metallic core, said system of stitches comprising uniformly distributed, crossing rows of stitches obtained by sewing.

7. Clothing article comprising a material according to claim 1 or claim 6.

8. A method of protecting an individual against electromagnetic energy comprising forming a clothing article to be worn by the individual from a shielding material according to claim 1 or claim 6.

* * * * *